Patented Dec. 28, 1948

2,457,226

UNITED STATES PATENT OFFICE 2,457,226

PREPARATION OF CHOLINE CHLORIDE

William F. Gresham, Wilmington, Del., assignor to E. I. du Pont de Nemours & Company, Wilmington, Del., a corporation of Delaware No Drawing. Application May 7, 1946, Serial No. 668,019

7 Claims. (Cl. 260—501)

This invention relates to the preparation of choline chloride and more particularly to a novel synthesis of choline chloride, using beta-(alkoxyalkoxy)ethylamines or derivatives thereof as starting materials.

Recently low cost processes have been developed for the synthesis of beta-(alkoxymethoxy)ethylamines and related compounds such as beta-(alkoxymethoxy)ethyl dimethylamines. These compounds may be prepared in excellent yield by processes which employ formaldehyde and hydrogen cyanide as starting materials. For example, it has been disclosed in copending applications S. N. 430,994, U. S. 2,398,757, and 430,995, U. S. 2,425,628, filed February 14, 1942, that beta-(alkoxymethoxy)ethylamines can be obtained by reacting formals with formaldehyde cyanhydrin and hydrogenating the resulting product. Beta-(alkoxymethoxy)ethyl dimethylamines can be prepared in excellent yield by hydrogenating beta-(alkoxymethoxy)ethylamines in the presence of formaldehyde, suitably with a cobalt-containing catalyst at a temperature of about 110° to 120° C. under pressure of about 200 atmospheres (cf. applications S. N. 545,003 filed July 14, 1944, and S. N. 548,802 filed August 9, 1944, both now abandoned).

Choline (beta-hydroxethyl trimethylamine hydrate) is a member of the vitamin B group and is generally considered to be necessary for normal nutrition. For example, choline has been found to be essential for egg production in chickens ("The Biological Action of the Vitamins," Evans, University of Chicago Press, 1942, page 169 et. seq.). Synthetic choline generally has been employed in the form of choline chloride.

Heretofore choline chloride has been prepared by the reaction between ethylene chlorohydrin and trimethylamine under anhydrous conditions (Journal of American Chemical Society, 32, 129 (1910)). While it was possible to prepare choline chloride from anhydrous ethylene chlorohydrin and anhydrous trimethylamine in excellent yield, the process, nevertheless, was quite costly in view of the relatively high cost of the anhydrous reactants.

An object of this invention is to prepare choline chloride in high yield from relatively inexpensive starting materials. Other objects of the invention will appear hereinafter.

These objects are accomplished in accordance with the invention by bringing a beta-(alkoxyalkoxy)ethyl trimethylammonium formate, and more particularly a beta-(alkoxymethoxy)ethyl trimethylammonium formate, into contact with hydrochloric acid, (aqueous or anhydrous) and an alkanol, whereby a mixture containing choline chloride is produced. Choline chloride may be separated from the resulting mixture by suitable methods, such as by removal of the volatile ingredients by distillation. In a specific embodiment the invention contemplates reacting beta-(alkoxymethoxy)ethyl trimethylammonium formate with hydrochloric acid and ethanol, and thereafter separating choline chloride from the resulting reaction product. In another embodiment the invention contemplates heating methyl formate with a beta-(alkoxymethoxy)ethyl dimethylamine in a closed vessel under superatmospheric pressure, separating beta-(alkoxymethoxy)ethyl trimethylammonium formate from resulting mixture, treating the said beta-(alkoxymethoxy)ethyl trimethylammonium formate with hydrochloric acid and an alcohol and thereafter separating choline chloride from the resulting reaction product.

The reactions which are involved in the preparation of choline chloride may be illustrated, in specific embodiments, as follows:

1. $C_2H_5OCH_2OCH_2CH_2N(CH_3)_2 + CH_3OOCH \rightarrow$
$C_2H_5OCH_2OCH_2CH_2N(CH_3)_3(OOCH)$

2. $C_2H_5OCH_2OCH_2CH_2N(CH_3)_3$

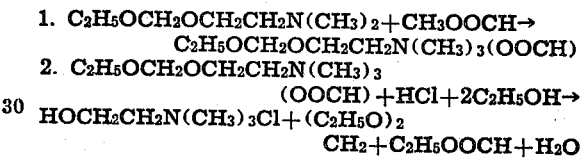

The reaction between the beta-(alkoxymethoxy)ethyl dimethylamine and methyl formate in accordance with Equation 1 is generally conducted in a closed vessel at a temperature of about 75° to 200° C., preferably 140° to 150° C. It is usually desirable to employ at least a slight excess of methyl formate and to recover the same after the reaction ceases, together with any unreacted beta-(alkoxymethoxy)ethyl dimethylamine. The reaction between the beta-(alkoxymethoxy)ethyl trimethylammonium formate, HCl, and alkanol in accordance with Equation 2 takes place quite readily and choline chloride is produced thereby in excellent yield. This reaction takes place at a convenient rate at temperatures of at least about 50° C., usually about 50° to 175° C.; higher temperatures may be employed but are generally not necessary.

The invention is illustrated further by means of the following example.

*Example 1.*—A reaction mixture containing beta-(ethoxymethoxy)ethyl dimethylamine with an excess of methyl formate was heated in a closed vessel at a temperature of 140° to 150° C. under a pressure of 250 pounds per square inch for several hours. The excess methyl formate was recovered by distillation, after which the unconverted tertiary amine was separated by distillation at 4 mm. pressure, leaving as a residue a nonvolatile quaternary formate, (ethoxymethoxy)-ethyl trimethylammonium formate, having the formula $$C_2H_5OCH_2OCH_2CH_2N(CH_3)_3OOCH$$

This residue of quaternary formate was heated with ethanol and hydrogen chloride in the molal ratio of 1:4:1.5 under refluxing conditions, while an ethylalethanol azeotrope was removed therefrom by distillation. When the reaction was complete the remaining volatile constituents of the reaction mixture were removed by distillation under reduced pressure leaving a residue of crude choline chloride which was purified by crystallization from isobutanol.

It is to be understood that the foregoing example is illustrative only and that the invention is not limited thereto. If desired, the dialkyl formal obtained in accordance with Equation 2 (vide supra) may be recycled to a reactor in which beta-(ethoxymethoxy)ethyl dimethylamine is prepared from the said formal and formaldehyde cyanhydrin. Moreover, the beta-(alkoxymethoxy)ethyl dimethylamine may be beta-(methoxymethoxy)ethyl dimethylamine, in which instance the alkyl formate produced in accordance with Equation 2 is methyl formate, which can be recycled with beta-(methoxymethoxy)ethyl dimethylamine for the preparation of quaternary formate in accordance with Equation 1.

Since many different embodiments of the invention may be made without departing from the spirit and scope thereof it is to be understood that I do not limit myself except as set forth in the following claims.

I claim:

1. In a process for the synthesis of choline chloride the step which comprises contacting a beta-(alkoxyalkoxy)ethyl trimethylammonium formate with hydrochloric acid and an alkanol, whereby a mixture containing choline chloride is produced.

2. A process for the synthesis of choline chloride which comprises reacting a beta-(alkoxymethoxy)ethyl trimethylammonium formate with hydrochloric acid and an alkanol, and thereafter separating choline chloride from the resulting reaction products.

3. A process for the synthesis of choline chloride which comprises reacting a beta-(alkoxymethoxy)ethyl trimethylammonium formate with hydrochloric acid and an alkanol, at a temperature of at least about 50° C. and thereafter separating choline chloride from the resultant reaction products.

4. A process for the synthesis of choline chloride which comprises reacting beta-(ethoxymethoxyoxy)ethyl trimethylammonium formate with hydrochloric acid and ethanol at a temperature of at least about 50° C. and thereafter separating choline chloride from the resultant reaction products.

5. A process for the synthesis of choline chloride which comprises heating methyl formate with a beta-(alkoxymethoxy)ethyl dimethylamine in a closed vessel at a temperature of about 75° to 200° C., separating beta-(alkoxymethoxy)ethyl trimethylammonium formate from the resulting mixture, treating the said beta-(alkoxymethoxy)-ethyl trimethylammonium formate with hydrochloric acid and an alkanol at a temperature of at least about 50° C. and thereafter separating choline chloride from the resultant reaction products.

6. A process for the synthesis of choline chloride which comprises heating methyl formate with beta-(ethoxymethoxy)ethyl dimethylamine at a temperature of about 140° to 150° C. under superatmospheric pressure, thereafter separating beta-(ethoxymethoxy)ethyl trimethylammonium formate from the resulting mixture, treating the said beta-(ethoxymethoxy)ethyl trimethylammonium formate with hydrochloric acid and ethanol at a temperature of at least about 50° C. and thereafter separating choline chloride from the resultant reaction products.

7. A compound having the formula $$C_2H_5OCH_2OCH_2CH_2N(CH_3)_3OOCH$$

WILLIAM F. GRESHAM.

REFERENCES CITED

The following references are of record in the file of this patent:

UNITED STATES PATENTS

| Number | Name | Date |
|---|---|---|
| 2,395,281 | Loder | Feb. 19, 1946 |

OTHER REFERENCES

Ziff et al., "J. Am. Chem. Soc.," vol 60, (1938), pages 178–182.

Certificate of Correction

Patent No. 2,457,226. December 28, 1948.

WILLIAM F. GRESHAM

It is hereby certified that errors appear in the printed specification of the above numbered patent requiring correction as follows:

Column 1, line 27, after the word "abandoned" and before the period insert a closing parenthesis; column 3, line 53, claim 2, for the word "resulting" read *resultant*; column 4, lines 9 and 10, claim 4, for "beta-(ethoxymethoxyoxy)" read *beta-(ethoxymethoxy)*;

and that the said Letters Patent should be read with these corrections therein that the same may conform to the record of the case in the Patent Office.

Signed and sealed this 10th day of May, A. D. 1949.

[SEAL]

THOMAS F. MURPHY,
*Assistant Commissioner of Patents.*